(12) United States Patent
Stauffer

(10) Patent No.: US 9,193,482 B2
(45) Date of Patent: Nov. 24, 2015

(54) FURTHER AIRPORT BOUNDARY/EDGE MARKER IMPROVEMENTS

(71) Applicant: Scott P. Stauffer, North Huntingdon, PA (US)

(72) Inventor: Scott P. Stauffer, North Huntingdon, PA (US)

(*) Notice: Subject to any disclaimer, the term of this patent is extended or adjusted under 35 U.S.C. 154(b) by 156 days.

(21) Appl. No.: 13/909,831

(22) Filed: Jun. 4, 2013

(65) Prior Publication Data

US 2013/0342372 A1 Dec. 26, 2013

Related U.S. Application Data

(63) Continuation-in-part of application No. 12/660,060, filed on Feb. 20, 2010, now Pat. No. 8,454,189.

(60) Provisional application No. 61/208,551, filed on Feb. 25, 2009.

(51) Int. Cl.
| | |
|---|---|
| *F21S 6/00* | (2006.01) |
| *F21S 8/00* | (2006.01) |
| *B64F 1/18* | (2006.01) |
| *F21V 13/02* | (2006.01) |
| *B64F 1/20* | (2006.01) |
| *F21Y 103/00* | (2006.01) |
| *F21V 21/02* | (2006.01) |
| *F21W 111/06* | (2006.01) |

(52) U.S. Cl.
CPC ... *B64F 1/18* (2013.01); *B64F 1/20* (2013.01); *F21V 13/02* (2013.01); *B64D 2203/00* (2013.01); *F21V 21/02* (2013.01); *F21W 2111/06* (2013.01); *F21Y 2103/00* (2013.01)

(58) Field of Classification Search
CPC ............. F21W 2111/00–2111/10; B64F 1/20; B64F 1/18; B64D 2203/00; F21V 1/00–1/26; F21V 3/00–3/049
USPC ...................... 362/153, 153.1, 555, 559, 560, 362/217.01–225
See application file for complete search history.

(56) References Cited

U.S. PATENT DOCUMENTS

| | | | | |
|---|---|---|---|---|
| 4,253,085 | A * | 2/1981 | Hidler et al. .................. | 340/908 |
| 6,592,245 | B1 * | 7/2003 | Tribelsky et al. ............. | 362/551 |
| 7,134,764 | B1 * | 11/2006 | Bieberdorf ..................... | 362/183 |
| 2006/0109667 | A1 * | 5/2006 | Flaherty et al. ............... | 362/431 |
| 2012/0155071 | A1 * | 6/2012 | Sato et al. ................ | 362/217.05 |

* cited by examiner

*Primary Examiner* — Mariceli Santiago
(74) *Attorney, Agent, or Firm* — Gary P. Topolosky

(57) ABSTRACT

A boundary/edge recognition system for on ground vehicular traffic, especially airport runways and taxiways that uses multiple markers, each marker including an elongated tube with a light source in or near the tube for illuminating one or more slits or a plurality of apertures in the tube. Preferred embodiments include spring mounts and/or means for indicating misalignment. Additional options include a defroster/heater and/or bird roost prevention means.

18 Claims, 7 Drawing Sheets

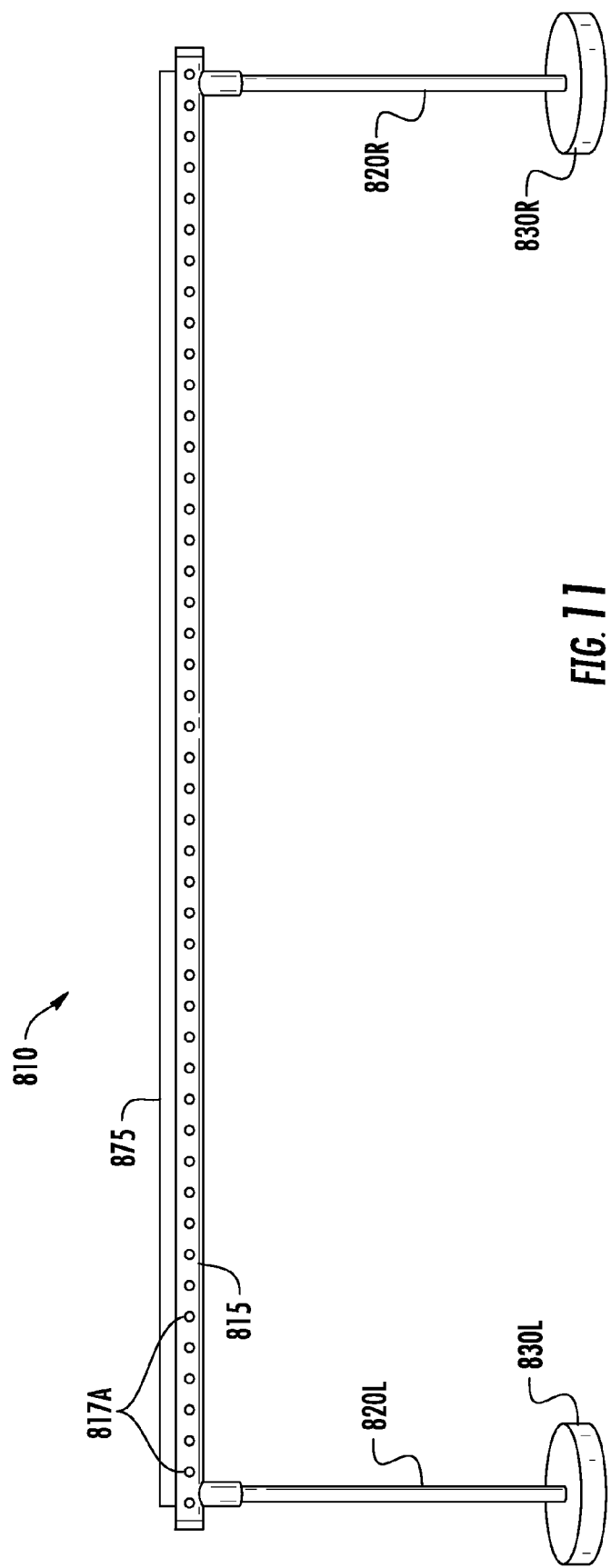

FURTHER AIRPORT BOUNDARY/EDGE MARKER IMPROVEMENTS

CROSS-REFERENCE TO RELATED APPLICATIONS

This application is a continuation-in-part of application Ser. No. 12/660,060, filed on Feb. 20, 2010 and issuing as U.S. Pat. No. 8,454,189, which application claimed the benefit of U.S. Provisional Application Ser. No. 61/208,551, filed on Feb. 25, 2009, both disclosures of which are incorporated by reference herein.

BACKGROUND OF THE INVENTION

1. Field of the Invention

The invention is intended to improve safety for ground vehicle traffic about industrial plants and warehouses, and for outdoor venues like airport runways and taxiways. This invention especially improves the situational awareness and orientation of pilots while navigating about the grounds of an airport before takeoffs and after landings.

2. Relevant Art

Situational awareness of pilots about an airport has been identified as a main contributor to runway incursions around the world. Experts have prioritized runway incursions as a top area of weakness in aviation safety. Improving the ability of pilots to quickly recognize safe runway exit locations at runway/taxiway intersections, and to better recognize the runway/taxiway intersections they are approaching will reduce the number of incidents, accidents, incursions, and excursions that occur each year. Due to the existing arrangement of runway/taxiway lights, visual orientation is especially difficult at night and during periods of reduced visibility due to precipitation and fog. Unfortunately, snow accumulations obscure visually painted pavement indicators.

Since the early days of aviation, devices have been developed for assisting pilots in navigating and recognizing their environment. Until this invention, such devices have consisted of single points of light arranged about an airport, some with lenses for light focusing for greater visibility to an approaching aircraft. In basic terms, these existing visual cues exist as nodes of light. Light nodes can become confusing at night, however, or during reduced visibility periods or when approaching the light from an angle out of alignment with the runway or taxiway they are illuminating. At larger airports, these lights may appear as a "sea" of random lights which may not provide adequate visual cues for pilots to easily navigate thereabout.

Recent systems have been designed for reducing lighting costs using technologies that consume less energy. Systems have been engineered to allow the recessing of lights to be flush with the runways and taxiways thereby reducing the risk of damage to same. Systems have also been installed to act as conventional stop lights, i.e., electronically controlled, visual signal indicators for serving as a "back up" to errant air traffic controller instructions and/or pilots and ground personnel who may accidentally cross a runway while another aircraft is taking off or landing. All of these systems improve travel safety while deploying the conventional technology of single light nodes, sometimes in varying colors, or with continuous illumination, pulsating and/or preset flash sequences.

Single nodes of light offer a good foundation for situational awareness. But such devices are not completely adequate. Recent research has taken place with regard to video displays, i.e. the visual cues used by the human eye, and the way our eyes behave to transmit sight information to the brain. From that research, it has been shown that short sequences of discontinuous lines allow the brain to more efficiently interpolate line sequences and create a more complete picture. Such line segment interpolating allows the brain to identify patterns by mapping out line segments in several directions. Similar technologies have been used for reducing the amount of information being displayed on a video monitor while still enhancing the picture that viewer perceives. However, the number, size and length of these line segments, created by pixels, vary greatly from the segments of light employed by the present invention.

Many of today's current airport runways employ a lighting system that uses runway and taxiway edge lights like those shown in accompanying FIG. 1—Prior Art. Such lights, or traditional omni-directional luminaire 10, are commonly affixed to a vertical spar 20 which, in turn, connects to a round base plate 30. That base plate 30 typically attaches to the airport runway surface with 4 to 6 bolts (not shown) on a 10.25 inch bolt circle. From the center of base plate 30, vertical spar 20 extends upward and houses electrical wires (not shown) for supplying power to the luminaire/light source 50 sitting atop vertical spar 20. Below base plate 30, there is usually a transformer (not shown) at least partially encased in the ground and connected to wires for completing the electrical circuit for each luminaire.

In the airport lighting industry, the preceding model luminaire is known as an L-867 or "base" when it has no light atop, an L-861T for the elevated taxiway light model and an L-861E for the elevated runway light model. A light diffuser can be attached to the illumination source with one or more clamps or other quick disconnect means. That light diffuser protects the illumination source from external elements while also focusing the light emanating from same. The diffuser may be colored to help pilots better distinguish a runway light from its taxiway or obstruction light equivalents. A main advantage of the present invention is that it can be retrofitted to fit partially over or about an existing diffuser unit, fit fully over same, or fully replace the lens/single bulb of a known airport diffuser unit with the radially armed indicia described below.

Other known prior art devices in this field include the following (arranged in chronological order): Hansler et al. U.S. Pat. No. 7,083,315, with their elevated runway and taxiway edge lighting system that employs light emitting diodes. Rhodes U.S. Pat. No. 6,354,714 more broadly covers LED lighting systems for embedding to improve the visibility of airport runways, walkways and roadways. These same embedded LED's can also be used for floor marking Rizkin et al. U.S. Pat. No. 6,155,703 shows a surface-mounted light assembly for illuminating the outer boundaries of a ship deck or heliport. Using a prism with three flat sides, Barrow U.S. Pat. No. 5,669,691 shows an in-pavement light fixture for airport runways and taxiways. A system with a series of reflective mirrors is used by the runway embedded, light emitter of Ahlen U.S. Pat. No. 5,438,495. The flush runway light system of Pannier U.S. Pat. No. 4,924,364 employed a removable optical unit.

Puttemanns et al. U.S. Pat. No. 4,521,836 showed an elevated runway, taxiway or threshold edge light beneath a sealed glass dome. That same year, Tauber et al. patented their own airport runway, taxiway or edge light in U.S. Pat. No. 4,499,527. Finally, the runway lighting system of Daley U.S. Pat. No. 3,567,917 is known for employing flexible, light-conveying conduits. Despite the foregoing, improvements to this specialized field of transportation illumination are still an utmost goal as spelled out in Transportation Safety Improvements, Aviation Issue Areas, Most Wanted. See, www.ntsb. gov/recs/mostwanted/aviation_issues.htm#most.

SUMMARY OF THE INVENTION

The present invention overcomes the limitations of single node prior art devices described above. A principle object of this invention, in accordance with one embodiment, consists of a system of rod-like light patterns, each rod replacing, supplementing and/or enhancing the single node light atop a traditional airport light base. Utilizing a plurality of radial arms (either self-lighting, reflective or both), this invention creates illuminated line segments collinear with the airport runway or taxiway boundaries/edges they represent.

Retrofitting the known lighting systems of L-867, L-861T and/or L-861E (FIG. 1—Prior Art) allows lighted rods to better orient horizontally, extending in the same direction as the airport pavement edge. The length and spacing of each rod can be adjusted to maximize the ability of the human eye to interpolate illuminated line segments from a distance thereby better identifying the pattern and/or delineation of airport pavement edges. The color of each rod may be specially chosen based on an accepted code representing each boundary. For example, blue rod cones may be used along taxiway pavement edges and white along segments of runway pavement edges. It is also possible to use multiple cone colors on the same lighting unit for greater directional guidance.

The rods employed by this invention may be suspended in a counterbalanced manner, extending as either: plural radial arms (per FIG. 2); multiple rods extending in different directions for identifying a runway/taxiway intersection (per FIG. 3); or spanning between two or more posts (per FIG. 4). In some cases, the rod mounted about, above or below a traditional base model allows omni-directional viewing of the traditional luminaire, while providing enhanced edge line guidance over the same base model without the invention added thereto (per FIG. 5).

When counterbalanced above a single mount, a pivot point allows the lighted rod(s) of this invention to be rotated for maintenance access. The intensity from said illumination sources can be made adjustable using existing, conventional methods.

Each lighted rod installed according to this invention would appear to pilots and other airport personnel as a line segment, hereinafter "indicium". The combination of indicia in an array of airport runway/taxiway lights creates a more accurate representation (or better simulation) of all lighted pavement edges per accompanying FIG. 8B. When used with existing airport pavement lights, signs, and other visual cues, pilot orientation is enhanced and overall travel safety improved.

BRIEF DESCRIPTION OF THE DRAWINGS

Further features, objectives and advantages of the present invention will become clearer when referring to the following detailed description of preferred embodiments made with reference to the accompanying drawings in which:

FIG. 11 is a front plan view showing an alternate, spring mount at both tube ends; it also shows one version of defroster/heater element extending across the top surface of same.

DETAILED DESCRIPTION OF PREFERRED EMBODIMENTS

Figure 1:
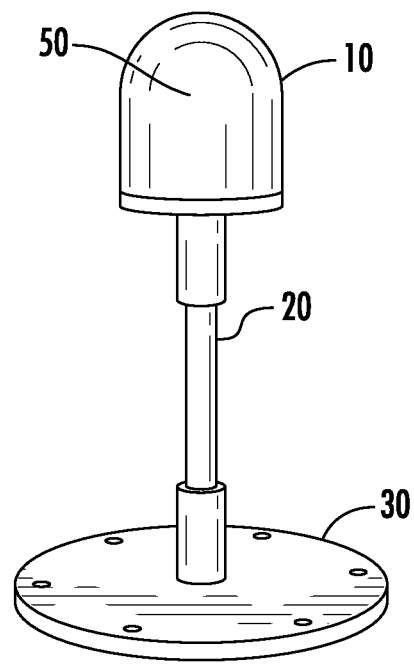
FIG. 1 is a front perspective view of a prior art airport runway or taxiway light fixture.

It should be noted that common features in the different views of this invention are shown with the same reference numeral(s). For alternate embodiments of the same component, there is consistent numbering though in the next hundred series.

Figure 2:
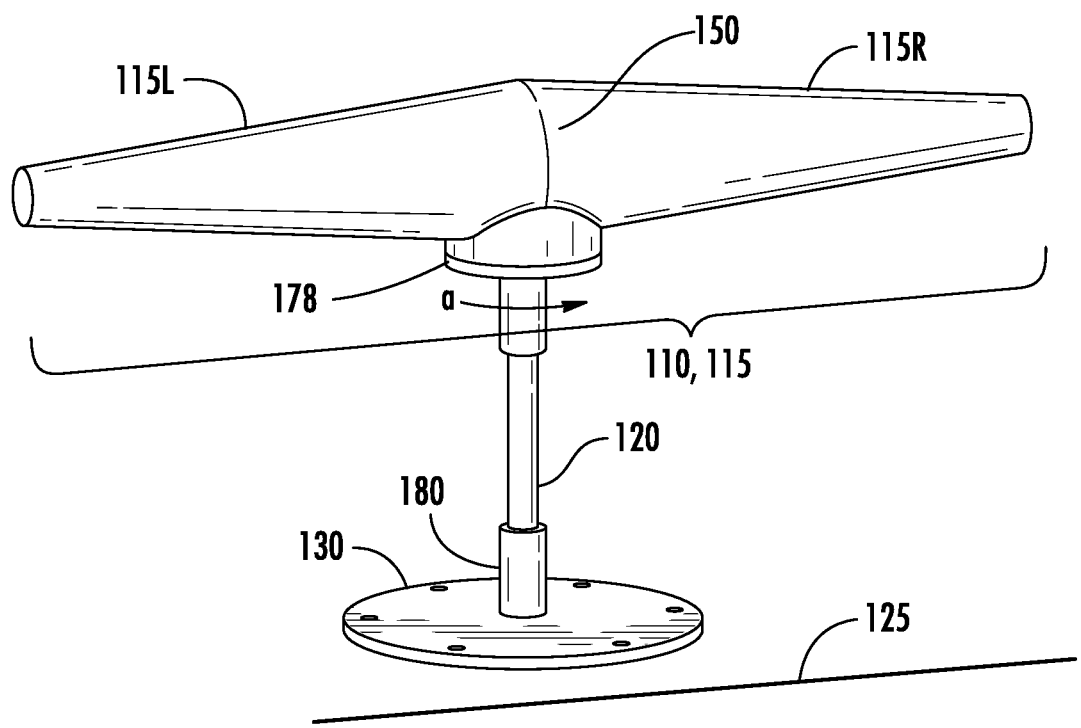
FIG. 2 is a front perspective view of a first embodiment of illuminated marker or indicium being used as a boundary edge.

Referring to a first embodiment of the present invention, FIG. 2 shows an indicium, generally 110, said indicium including a plurality of radial arms 115, which may be flexible or rigid. In either case, arms 115 are mounted to a central support or vertical spar 120 extending upwardly from a traditional light base plate 130 similar to the base plate for prior art model L-867 described above (at FIG. 1). The luminaire/light source 150 sitting atop vertical spar 120 allows a properly sized and shaped indicium 110 (either straight or curved), to serve as a visual cue/marker/signal or indicator relating to the airport pavement boundary/edge 125 it represents. Per FIG. 2, indicium 110 has a generally straight configuration when viewed from the top. It is to be understood, however, that if intended to show a pavement edge or boundary 125 that may be somewhat curved, indicium 110 may itself take on an overall curved shape or profile.

As shown in FIG. 2, each radial arm 115 of indicium 110 is constructed as a static object resembling a tube, pipe, baton, channel, conduit, duct, hose or other light conducting media. These radial arms 115 are suspended from opposed sides, or in a counterbalanced manner, more particularly as left arm 115L and right arm 115R. The combination of arms 115 aligns collinearly with the pavement edge 125 that this particular indicium 110 is designed to protect. It is understood, however, that with the present invention, it is possible for indicium to have two or more radial arms from other than opposite sides for indicating/protecting airport runway/taxiway intersections and the like.

Radial arm 115, as an object, may be constructed as a solid translucent, light conducting material or hollow body, closed at both ends and fitting over the top half to domed illumination source 150 of an existing runway/taxiway marker. An alternative embodiment of this invention would also allow for full coverage of the radial arm units completely over an existing marker's illumination source. On a preferred basis, the radial arms 115 of this invention are fitted with their own internal illumination source (not shown), said source including internal light manipulating elements like mirrors and/or lenses for creating an optimum homogenous distribution of light distribution from within the body of radial arm 115.

Representative internal illumination sources for radial arms 115 may include one or more self-illuminating sub-elements such as an incandescent filament, laser, optical fiber bundle, LED, filament of ionized gas, fluorescence and/or stimulated emission of radiation. It is preferred that any such light source 150 illuminate the entire length of each radial arm 115. Such lights may be white light or pigmented, a representative example of which would be a plurality of blue colored LED lights.

One or more pigments may be added to the translucent material used for making radial arm 115 so that when said arm 115 covers an existing illumination source 150 or has its own self-illuminating unit inside, the resulting indicia color matches an approved code or other desired result. Alternately, each sub branch to radial arm 115 may be differently tinted for the same indicium 110 to provide greater levels of boundary information to pilots and other airport personnel.

Indicium 110 can be affixed with a clamp (not shown) for sealing same to the vertical spar 120 thus protecting the internal electrical connection as it transitions from base plate 130 to illumination source 150. Per FIG. 2, the longitudinal axis of indicium 110 is oriented parallel or tangent to the boundary/edge 125 it is protecting. A pivot action connector with a keyed flute, indexing dial or detent, aids in realignment of indicium 110 with the intended boundary edge 125 after maintenance is performed. A precise pivot point 178 about the y-axis is collocated with clamp (not shown) or another quick disconnect device nearest the top of vertical spar 120.

Like the model at FIG. 1—Prior Art, the vertical spar 120 of indicium 110 connects to its base plate 130 via an adapter 180. In a typical installation, there would be a transformer (not shown) below base plate 130, encased in the ground and connected to electric wires. Like earlier counterparts, the intensity of illumination source 150 within indicium 110 may be made adjustable by conventional methods. And though not shown, it is understood that any embodiments of this invention may be fitted with spiked regions and/or other physical deterrents for preventing birds from roosting on same.

In the operation of this first embodiment, indicium 110 is counterbalanced over a single mount, via pivot point 178 and about a seal (not shown). Such mounting allows indicium 110 to be rotated for maintenance servicing purposes, snow removal and/or lawn maintenance about the spar 120 and base plate 130. Arrow A, in FIG. 2, shows one direction of rotation for that particular indicium 110.

Figure 7:
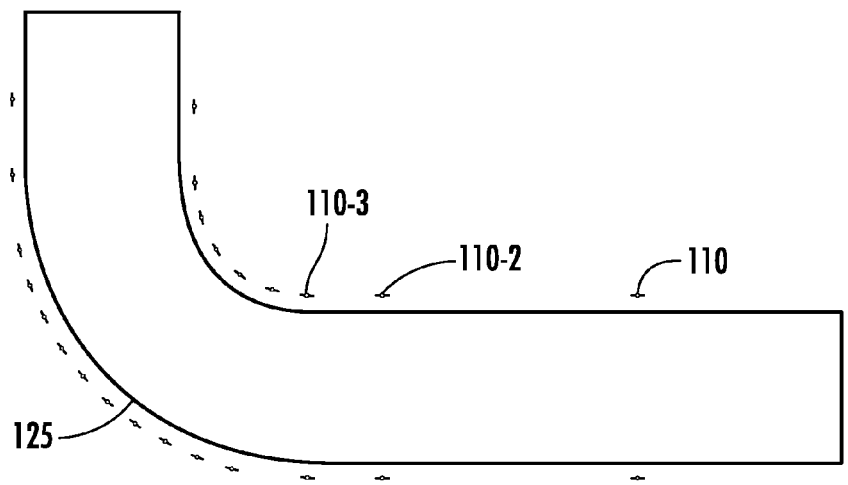
FIG. 7 is a top perspective view of multiple indicia according to this invention being used to outline a pathway for on ground airport traffic.
Figure 8A:
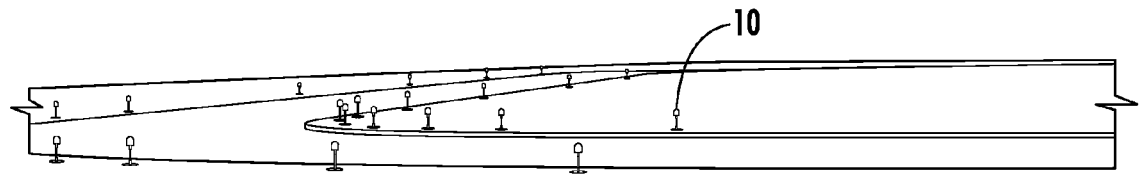
FIGS. 8A and B are top and bottom comparisons showing two sets of multiple airport lights as used before the invention (FIG. 8A) and with indicia of this invention installed there on (FIG. 8B)
Figure 8B:
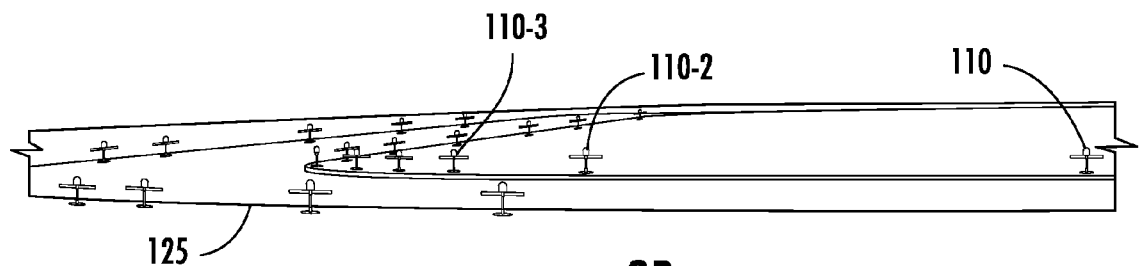

As seen in accompanying FIGS. 7 and 8B, the normal position for indicium 110 is aligned with the pavement edge 125 it is meant to represent. Preferably, the spacing between adjacent indicia 110-2, 110-3 decreases as the ratio of change in the angle of a tangent moving over a given arc to the length of that arc increases. And the overall length of indicia 110-2, 110-3 may decrease as the spacing between adjacent spars (or lighting units) decreases.

When viewed from a distance of several meters, indicia 110 will mark the immediate termination of a boundary. From a greater distance, the short sequencing of discontinuous lines allows the brain to efficiently interpolate line sequences (i.e. filling in the dashed lines) thereby creating a more complete, linearly connected outline. The combination of light fixtures so described creates an accurate representation of all pavement edges 125. See, especially, the differences in lighting units before and after installation according to this invention in the top and bottom, comparative side views of several consecutive lighting units at FIGS. 8A and B. When used with existing pavement signs, and other visual cues, individual pilot awareness will be enhanced and overall safety orientation improved.

Another benefit from the designs of this invention is that any heat produced by illumination source 150 of indicium 110 will suffice in preventing snow and ice from accumulating thereon. For airports that experience substantially greater, extreme snowfall situations, a supplemental controlled internal heat source may be added.

Figure 3:
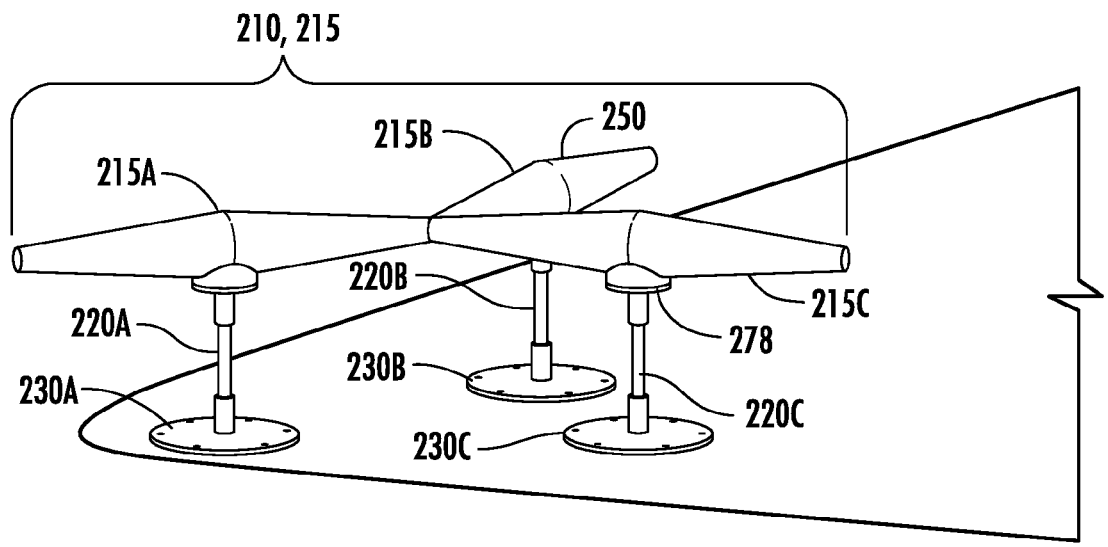
FIG. 3 is a top right perspective view of a second embodiment of indicium used at a pavement/boundary intersection.

In FIG. 3, there is shown a second embodiment of indicium 210 having a plurality of radial arms 215, or in this case, three arms 215A, 215B and 215C. Said radial arms 215 can be made flexible or rigid, but, in any event, the joined/combined arms all mount to their respective vertical spars 220A, 220B and 220C, each of which rises from their respective, centrally located, traditional base plates 230A, 230B and 230C. And while the individual arms 215 of FIG. 3 are shown substantially straight in a side (or top) profile, it is understood that other embodiments of airport runway and taxiway lighting may enable the used of curved or wavy alternatives.

Radial arms 215A, 215B and 215C of FIG. 3, are duly sized and shaped, (either in a straight or somewhat curved configuration), to provide pilots and other airport personnel with a visual cue/indicator/signal relating to the pavement edge or boundary 225 they represent. For this particular embodiment, edge/boundary 225 is more of an intersection or crossroad on the airport runway/taxiway. Radial arms 215A, 215B and 215C are each constructed from a static object tube, pipe, baton, channel, conduit, duct, hose or other light conducting media, and all interconnected at one common, centrally situated end.

In this first intersection alternative, each radial arm 215 includes its own internal, self-illumination source 250 which may or may not include internal light manipulating mirrors and/or lenses (not shown) for creating an optimum homogenous light distribution inside indicium 210. That self-illuminating light for illumination source 250 may be selected from the group consisting of: an incandescent filament, laser, optical fiber bundle, LED, a filament of ionized gas, fluorescence, stimulated emission of radiation or combinations thereof.

In this second overall alternative, each internal terminal end to radial arm 215A, 215B and 215C appears to be permanently attached. But such an attachment would preclude using a common pivot for maintenance access. Alternately, a common pivot action point 278 (with a keyed flute, indexing dial or detent) may be provided. That pivot point 278 would assist maintenance personnel with properly realigning indicium 210 after maintenance has been performed. Even though the attachment point for this embodiment would not be permanent, the rotation of one radial arm 215 can be made possible without conflicting with the structure of adjacent radial arms.

Figure 4:
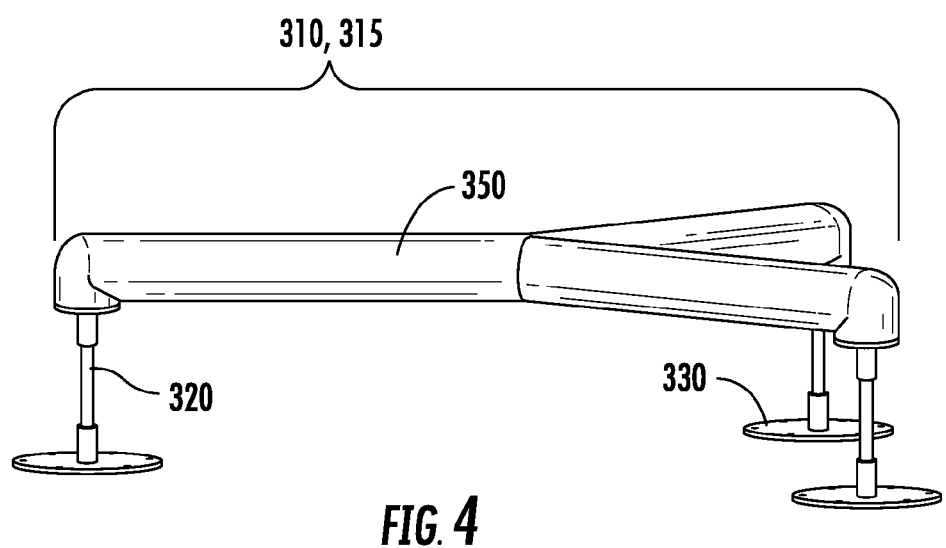
FIG. 4 is a top front perspective view of a third embodiment of indicium for an alternative pavement/boundary intersection marker.

Yet another alternative marker to the embodiment of FIG. 3 is shown in accompanying FIG. 4. Therein, alternate indicium 310 is constructed of two or more radial arms 315, (either flexible or rigid), each of which connects to its own vertical spar 320 rising up from its own base plate 330. Unlike the separate, tubular radial arm configuration in preceding FIG. 3, however, these alternative radial arms 315 appear to be suspended by, span between and at least partially cover or cap over adjacent luminary posts from pre-existing airport runway/taxiway marker units.

In FIG. 4, a light illumination source 350 enclosed within should properly illuminate the entire length of its radial arm 315. Only then can indicium 310 serve as part of a system of illuminated indicators for allowing the human brain to efficiently interpolate line sequences (between adjacent indicium) and thus create a more complete, visual "picture" of a runway/taxiway boundary.

Figure 5:
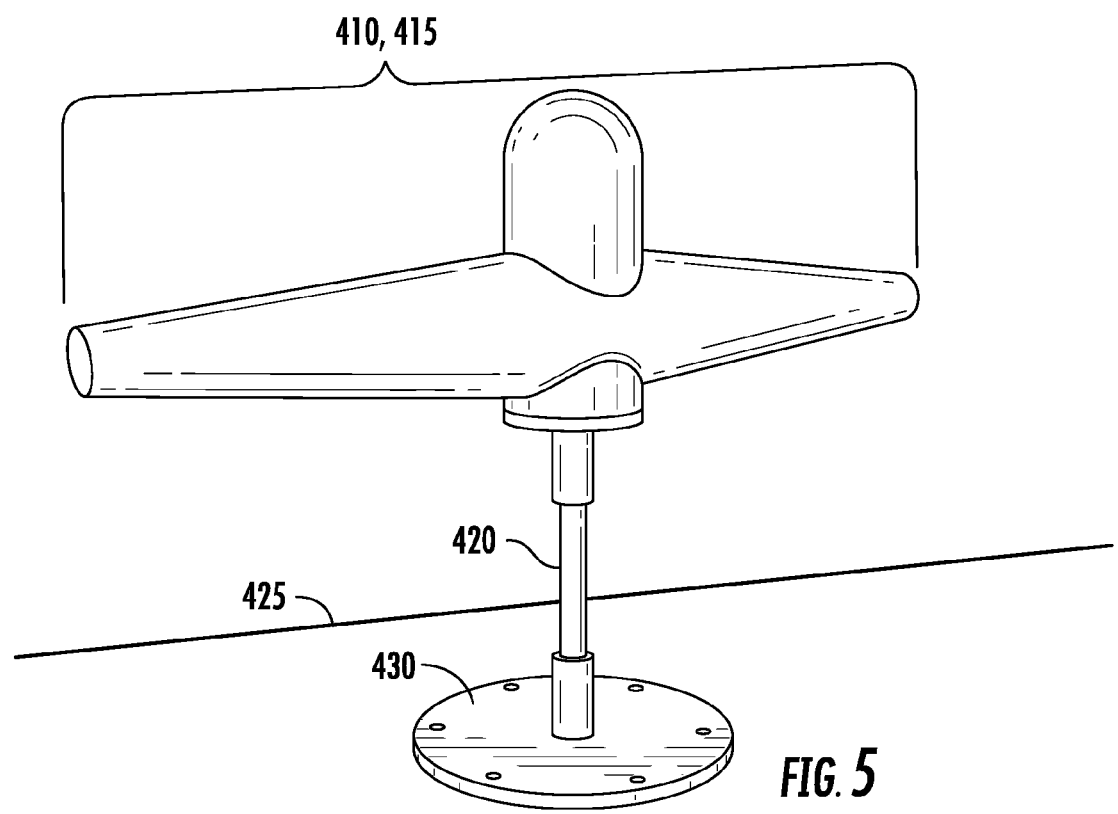
FIG. 5 is a front perspective, sectional view of a fourth embodiment of indicium for identifying a pavement edge.

A fourth embodiment of indicium 410 depicted in FIG. 5 has its own set of radial arms 415, both of which are suspended and counterbalanced over a shared vertical spar 420 that rises up from its own base plate 430. Altogether, the radial arms 415 of this indicium 410 will align collinearly with the pavement edge 425 they are assigned to protect. In this variation, separately illuminating radial arms 415 will be mounted eminently about, above or below, for including traditional luminaire with existing, FAA approved, airport lighting systems for greater pilot vision-enhancements. When such radial arms 415 are situated and clamped into place, they will promote greater omni-directional viewing of that luminaire from a distance. Viewed from a distance of several meters, indicium 410 marks the immediate termination of its boundary/edge 425. But when viewed from greater distances, a plurality of such indicia 410 allow the human brain to interpolate sequences of discontinuous line segments thereby creating a more accurate representation of pavement edges/boundaries for a region of airport traffic similar to that seen in accompanying FIG. 8B.

Figure 6:
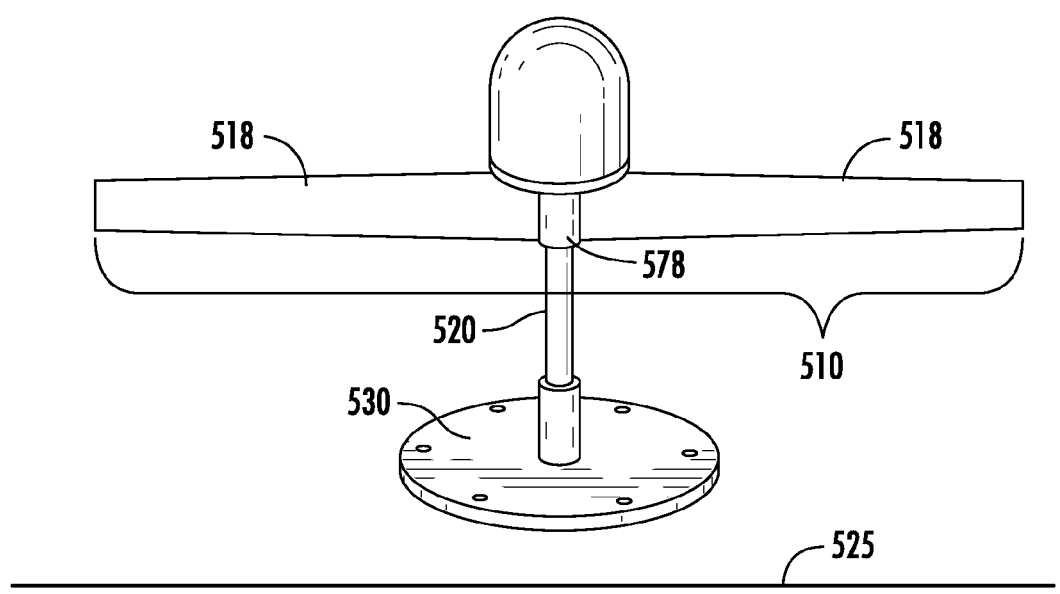
FIG. 6 is a top perspective, solid view of a fifth embodiment of indicium for an alternative pavement edge marker.

The fifth embodiment, at FIG. 6, shows an indicium 510 having a rigid, elongated reflector 518 attached to opposed sides of vertical spar 520 that rises up from base plate 530. Each reflector 518 is constructed as a solid, light-reflecting media that would be illuminated by an external light source. Like earlier illuminated radial arm counterparts, the size and shape of reflectors 518 will provide a visual cue to pilots that better simulates the airport pavement boundary/edge 525 it is designed to protect. With the mounting of reflective, horizontally extending surfaces to a traditional luminaire, by retrofit or by integral inclusion with the manufacture of new luminaire, there will be greater pilot vision-enhancements. In the latter operation, each indicium 510 would be affixed with reflective "wings" using one or more clamps (not shown). Alternately, models of indicia may be made with integrally formed, permanently mounted reflectors.

Preferably, there is provided a pivot point 578 about each vertical spar 520 that allows the reflectors 518 to be rotated out of harm's way for maintenance purposes, snow removal, and/or lawn maintenance. A main source for illuminating the reflectors 518 of indicia 510 can be the light from an approaching vehicle, illumination from adjacent lights and/or reflection from the sun's electromagnetic radiation. And like earlier, self-illuminating counterparts, it is preferred that the spacing of reflector-based indicia 510 be decreased as the ratio of the change in the angle of a tangent that moves over a given arc to the length of the arc increases. In addition, the length of each reflector arm may be incrementally decreased as the spacing between adjacent indicia 510 decreases. And while the minimal surface area atop each reflector 518 may be sufficient for preventing snow and ice accumulations thereon under most conditions, in higher snow markets, the indicium 510 may have a supplemental heater component added thereto.

Referring now to FIG. 8B, when the devices of this invention are viewed from a distance of several meters, the indicia 110 mark the immediate termination of airport pavement boundary 125. When viewed from a greater distance, a plurality of indicia 110 allows the brain to interpolate the sequences of discontinuous line segments from all indicia, or "connect the dashes" thereby creating a more accurate representation of the actual, official border to all pavement edges in sight. When used in conjunction with existing in-pavement lights, signs, and other existing visual cues; orientation is enhanced, hence safety is improved.

Figure 9:
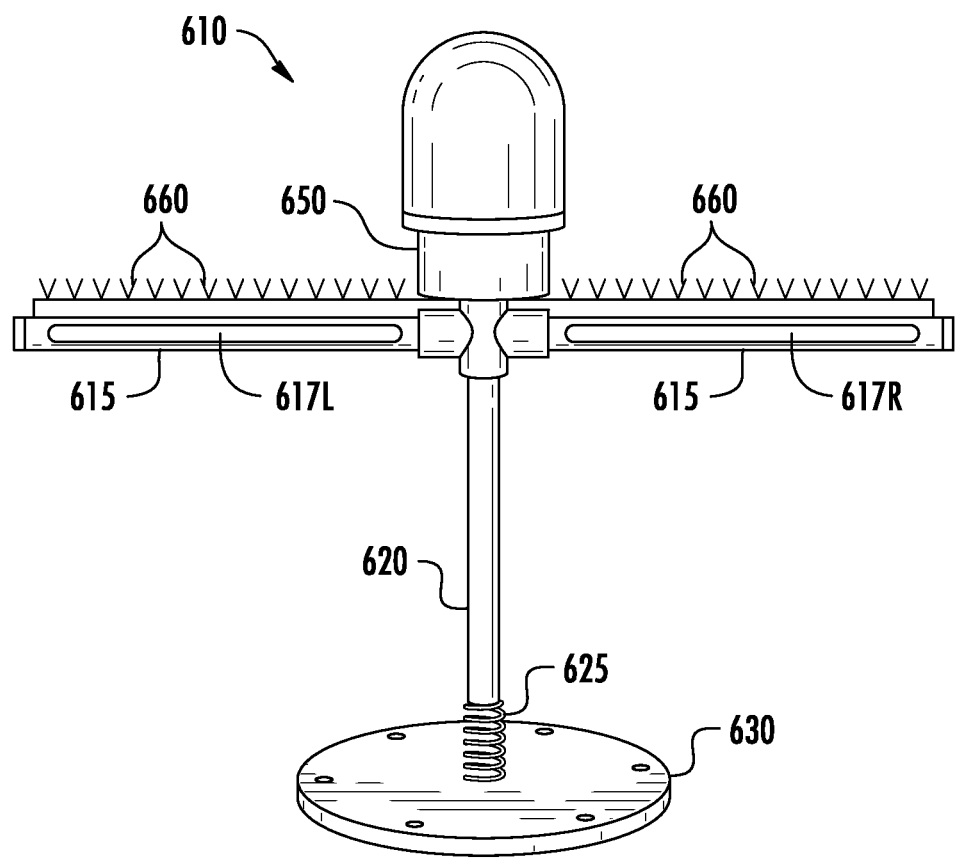
FIG. 9 is a front plan view of a sixth embodiment showing an elongated tube with lighted slots along both horizontal tube sections, dual vertical supports at both tube ends and one version of bird roost prevention.

In FIG. 9, yet another embodiment of indicium 610 is shown comprising an elongated tube 615 that serves as a left and right radial arm component that extends below the main (possibly pre-existing in the case of retrofitted applications) illumination source 650. Extending along most of the lateral length of each radial tube arm 615 is an elongated slit 617L and 617R through which a light source emits a continuous illumination. Though not seen in the current (black and white only) drawings, one preferred version of this embodiment emits bright blue light from a plurality of blue LED bulbs within the body of tube 615. Alternately, a light source external to but immediately adjacent tube 615 (not shown in FIG. 9) could use fiber optic lines with various termination points for distributing their light TO the tube itself and emulating an emission of marker indicating light as if coming from the tube body proper.

FIG. 9 shows an alternate mounting means as well, one in which a single support 620 to base 630 is fitted with a spring component 625 for enabling each such unit to take some degree of jostling before becoming inoperably dislodged.

In addition to the foregoing lighted slit variation, FIG. 9 depicts an optional bird roost prevention means. That deterrent 660 would consist of a strip of pointy plastic tips, extending in various directions from a top surface of tube 615 for "discouraging" any birds from resting on these markers in any perch-like manner.

Figure 10A:
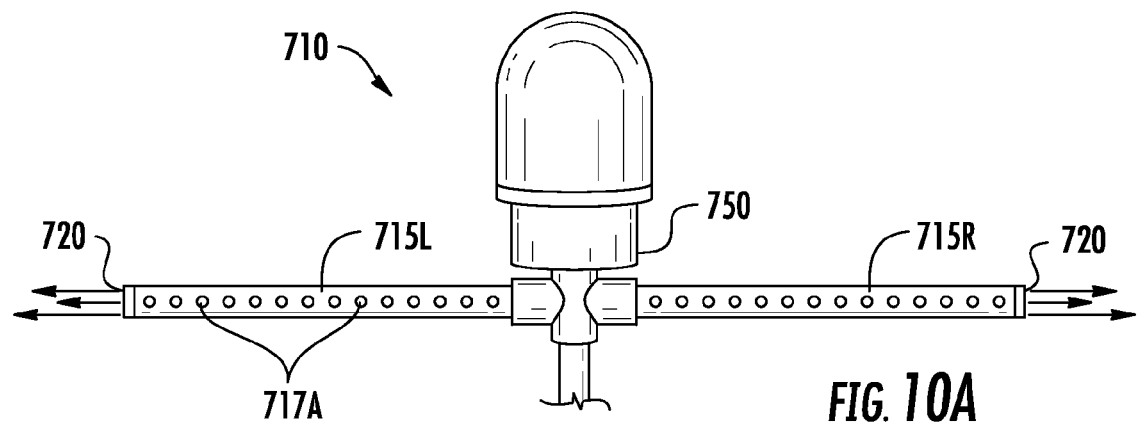
FIGS. 10A and B are front plan and perspective views, respectively, of a seventh embodiment showing a horizontal tube with a plurality of lighted apertures and a focused beam lens at opposed tube ends.
Figure 10B:
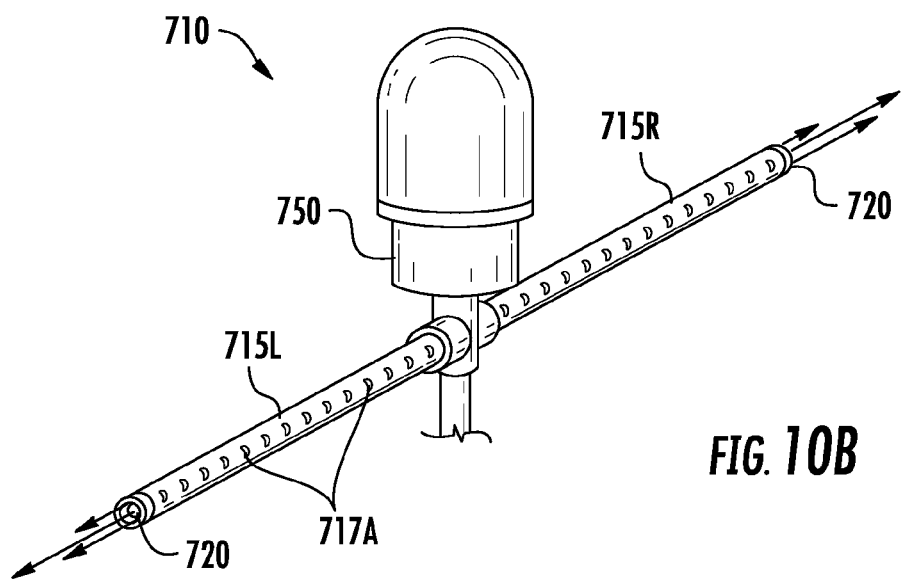

FIGS. 10A and B show a seventh variation of indicium 710 in which the two radial arms 715L and R beneath main illumination source 750 include a plurality of apertures 717A rather than one long, horizontally extending slit. In addition, this version includes a focused lens 720, at each tube end as shown. That lens 720 takes beams of light from the light source within the tube proper for better focusing illumination signals to ground traffic (including aircraft pilots who have landed their craft) under less than ideal visual conditions. Particularly, with the emission of focused light beams from these lenses 720, it is more likely for the illumination sources to emit usable marker boundary/edge indicia under foggy conditions and/or the atmospheric reflective anomalies of a snow, sleet or rainstorm.

Finally, FIG. 11 shows an eighth variation in which the main boundary/edge indicium consists of a single elongated tube 815 . . . without any central (pre-existing) illumination source. There is no "850" equivalent. Rather, a single bar of lighted apertures 817A extend between a pair of vertical spar supports 820L and R, extending downwardly to their respective bases 830L and R. This variation may further include an element designed to prevent snow or ice from rendering each unit inoperable or less effective. As drawn, that is indicated by a defroster/heater bar 875 across most of the way across the top of tube 815.

In many of the foregoing, it is preferred that the internal mechanics of each unit provide some visual indication that that unit is no longer properly aligned for its intended purpose. Such misalignment could be caused by stiff winds, or more mechanical interruptions, like an accidental bumping by airport mowing/snow removal equipment or other land traffic. One such visual indicator is to merely stop illuminating from the main body of that misaligned unit. An alternate version might include activating a different colored sensor/ indicator (possibly with an audio signal/sound alarm) for getting the attention of ground personnel to correct any such light misalignments.

According to one embodiment of the invention, there is provided a three-dimensional elongated marking referred to as an indicium. Such marker indicia provide a much needed, additional visual cue for the human brain to effectively recognize the pavement edge or other boundary. While the above description contains much specificity, these should not be construed as limitations on the scope of any embodiment, but as exemplifications of the presently preferred embodiments thereof. Many other ramifications and variations are possible within the foregoing teachings. For example, the pivot point about the y-axis in the first embodiment may be located at the base of its vertical spar. Alternatively, each indicium may contain a coupling that would allow for full axial rotation for maintenance and/or servicing. Also, it should be understood that the size, shape and illumination method for any such indicium can take on countless forms to best represent an airport's runway or taxiway boundary. They may assume an elongated, pentagonal shape, be coated with reflective paints and/or illuminated from an external source. Such indicia can be left open at one or both ends and/or attached to objects other than a traditional L-867 base. Still further, the indicium of this invention may be designed for at least some partial embedding into the ground. Thus the scope of the invention should be determined by the appended claims and their legal equivalents, and not by the examples given hereinabove.

What is claimed is:

1. A boundary/edge marker for on ground traffic at an airport, said marker comprising:
   (a) an elongated tube that extends substantially horizontal to a ground surface and substantially parallel with a runway or taxiway boundary or edge, said elongated tube having one of:
      (i) a plurality of closely spaced apertures to form a row of lighted apertures; and
      (ii) an elongated slit through which a line of light will be emitted;
   (b) at least one structural support for connecting the elongated tube to a permanent surface;
   (c) a powered light source in or immediately adjacent to the elongated tube; and
   (d) at least one light-focusing lens at an end of the elongated tube.

2. The airport boundary/edge marker of claim 1 wherein the tube has multiple rows of lighted apertures or elongated slits.

3. The airport boundary/edge marker of claim 1 wherein the light source includes a plurality of LED lights inside the elongated tube.

4. The airport boundary/edge marker of claim 1 wherein said structural support extends substantially vertical.

5. The airport boundary/edge marker of claim 1 wherein said structural support extends substantially perpendicular to the elongated tube.

6. The airport boundary/edge marker of claim 1 wherein each structural support includes a spring-mounted component.

7. The airport boundary/edge marker of claim 1, which includes two or more tube structural supports located at or near each tube end.

8. The airport boundary/edge marker of claim 1, which further includes bird roost prevention means.

9. The airport boundary/edge marker of claim 1 wherein said tube is at least about 6 inches long.

10. The airport boundary/edge marker of claim 1 wherein said tube includes at least one angled or curved section.

11. The airport boundary/edge marker of claim 1, which further includes means for indicating, visually and/or by audio signal, when the marker has become misaligned.

12. The airport boundary/edge marker of claim 1, which further includes means for preventing ice or snow buildup on the elongated tube.

13. The airport boundary/edge marker of claim 1, which includes a visual indicator for a curve or corner section of the runway or taxiway.

14. A boundary/edge marker for an airport runway or taxiway, said marker comprising:
   (a) an elongated tube that extends substantially horizontal to a ground surface and substantially parallel with a runway or taxiway boundary or edge, said elongated tube having:
      (i) an elongated opening through which a line of light will be emitted; and
   (b) a light-focusing lens at each end of said elongated tube;
   (c) at least one structural support extending upwardly from the ground surface to the elongated tube; and
   (d) a powered light source in or immediately adjacent to the elongated tube at or near the light-focusing lens end of said elongated tube.

15. The runway or taxiway boundary/edge marker of claim 14 wherein the tube has multiple elongated openings.

16. The runway or taxiway boundary/edge marker of claim 14, which further includes at least one of: a defroster and a heating element.

17. A boundary/edge marker for vehicular traffic, said marker comprising:
   (a) a substantially horizontal extending elongated tube having at least one of: (i) an elongated slit through which a line of light will be emitted for visually indicating a boundary or edge; and (ii) a light-focusing lens at each tube end;
   (b) at least one structural support for attaching the elongated tube to a permanent surface;
   (c) a powered light source in or immediately adjacent the elongated tube; and
   (d) at least one of: a defroster and a heating element.

18. The boundary/edge marker of claim 17, which is suitable for use as a highway, bridge, tunnel, canal or nautical indicator.

* * * * *